United States Patent
Hombaiah et al.

(10) Patent No.: US 12,236,322 B2
(45) Date of Patent: Feb. 25, 2025

(54) TRAINING AND/OR UTILIZING A MODEL FOR PREDICTING MEASURES REFLECTING BOTH QUALITY AND POPULARITY OF CONTENT

(71) Applicant: GOOGLE LLC, Mountain View, CA (US)

(72) Inventors: Spurthi Amba Hombaiah, San Jose, CA (US); Vladimir Ofitserov, Foster City, CA (US); Mike Bendersky, Sunnyvale, CA (US); Marc Alexander Najork, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 116 days.

(21) Appl. No.: 18/074,774

(22) Filed: Dec. 5, 2022

(65) Prior Publication Data

US 2023/0094198 A1   Mar. 30, 2023

Related U.S. Application Data

(63) Continuation of application No. 16/946,779, filed on Jul. 6, 2020, now Pat. No. 11,551,150.

(51) Int. Cl.
| | |
|---|---|
| *G06N 20/00* | (2019.01) |
| *G06F 16/9038* | (2019.01) |
| *G06N 5/04* | (2023.01) |

(52) U.S. Cl.
CPC ......... *G06N 20/00* (2019.01); *G06F 16/9038* (2019.01); *G06N 5/04* (2013.01)

(58) Field of Classification Search
CPC ............. G06N 5/04; G06N 20/00; G06F 3/14
USPC .......................................................... 706/11
See application file for complete search history.

(56) References Cited

U.S. PATENT DOCUMENTS

| | | | |
|---|---|---|---|
| 10,394,832 B2 * | 8/2019 | Bendersky | G06F 16/337 |
| 10,601,454 B1 | 3/2020 | Luus et al. | |
| 10,970,293 B2 * | 4/2021 | Bendersky | G06F 16/252 |
| 11,126,630 B2 * | 9/2021 | Kulkarni | G06F 16/248 |
| 11,551,150 B2 * | 1/2023 | Hombaiah | G06F 16/335 |
| 2011/0258049 A1 | 10/2011 | Ramer et al. | |
| 2013/0254329 A1 | 9/2013 | Lin et al. | |
| 2013/0346182 A1 * | 12/2013 | Cheng | G06Q 30/0242 |
| | | | 705/14.41 |
| 2014/0365403 A1 * | 12/2014 | Demuth | G06N 20/00 |
| | | | 706/11 |

(Continued)

*Primary Examiner* — William D Titcomb
(74) *Attorney, Agent, or Firm* — Gray Ice Higdon

(57) ABSTRACT

Implementations relate to training a model that can be used to process values for defined features, where the values are specific to a user account, to generate a predicted user measure that reflects both popularity and quality of the user account. The model is trained based on losses that are each generated as a function of both a corresponding generated popularity measure and a corresponding generated quality measure of a corresponding training instance. Accordingly, the model can be trained to generate, based on values for a given user account, a single measure that reflects both quality and popularity of the given user account. Implementations are additionally or alternatively directed to utilizing such predicted user measures to restrict provisioning of content items that are from user accounts having respective predicted user measures that fail to satisfy a threshold.

19 Claims, 7 Drawing Sheets

(56) References Cited

U.S. PATENT DOCUMENTS

| | | | |
|---|---|---|---|
| 2015/0178626 A1* | 6/2015 | Pielot | H04L 51/046 |
| | | | 706/12 |
| 2015/0339572 A1* | 11/2015 | Achin | G06N 20/00 |
| | | | 706/46 |
| 2015/0379428 A1* | 12/2015 | Dirac | G06N 20/00 |
| | | | 706/12 |
| 2015/0379430 A1* | 12/2015 | Dirac | G06N 20/00 |
| | | | 706/12 |
| 2017/0154268 A1* | 6/2017 | Goldin | G06N 5/04 |
| 2017/0186029 A1 | 6/2017 | Morris et al. | |
| 2018/0046926 A1* | 2/2018 | Achin | G06F 9/5011 |
| 2018/0060738 A1* | 3/2018 | Achin | G06N 20/00 |
| 2018/0060744 A1* | 3/2018 | Achin | G06N 20/00 |
| 2018/0129651 A1* | 5/2018 | Latvala | G06F 40/40 |
| 2019/0087744 A1* | 3/2019 | Schiemenz | G06N 20/00 |
| 2019/0130304 A1 | 5/2019 | Gupta et al. | |
| 2019/0220705 A1* | 7/2019 | Min | G06F 18/2148 |
| 2019/0258904 A1* | 8/2019 | Ma | G06F 18/24133 |
| 2019/0272557 A1 | 9/2019 | Smith et al. | |
| 2019/0340256 A1* | 11/2019 | Kulkarni | G06F 16/24578 |
| 2020/0057961 A1 | 2/2020 | Vahdat et al. | |
| 2020/0134360 A1* | 4/2020 | Lilley | G06F 17/16 |
| 2020/0265296 A1 | 8/2020 | Olabiyi et al. | |
| 2020/0334492 A1 | 10/2020 | Yuan et al. | |
| 2022/0004918 A1 | 1/2022 | Hombaiah et al. | |

\* cited by examiner

TRAINING AND/OR UTILIZING A MODEL FOR PREDICTING MEASURES REFLECTING BOTH QUALITY AND POPULARITY OF CONTENT

BACKGROUND

Online platforms exist that enable creation of user accounts for the online platform, and that enable utilization of the user accounts to publish content items to the online platform under the name of the user account. For example, a user account can be used to craft an original content item that includes text, image(s), video(s), and/or other content. The content item can be published to the online platform and ascribed, by the online platform, as generated by the user account. As another example, a user account can be utilized to share a content item that was crafted by another user account of the online platform. The content item can be ascribed, by the online platform, as generated (e.g., shared) by the user account, but generated by another user account. User accounts of an online platform can additionally or alternatively be utilized in publishing content items to other online platforms or, more generally, to the Internet. As one example, a user account of a first online platform can be utilized to sign-in to a second online platform. Content generated by the user account can be published to the second online platform and ascribed by the second online platform and based on the sign-in with the user account, as generated by the user account. As another example, a user can cause a content item to be published to the Internet and independent of an online platform. In causing the content item to be published, the user can ascribe to the content item, user account information that explicitly or implicitly identifies a user account of the user, such as a user account of an online platform.

SUMMARY

Some implementations of this specification are directed to training a model (e.g., a regression model or other machine learning model) that can be used to process values for defined features, where the values are specific to a user account. The values can be processed using the model to generate a predicted user account measure (also referred to herein as a "predicted measure" or "predicted user measure") that reflects both popularity and quality of the user account.

In implementations that are directed to training the model, training instances are generated that each include training instance input of values that are specific to a corresponding user account, such as a user account of an online platform. The training instances each further include labeled training instance outputs that include a corresponding generated quality measure for the user account, as well as a corresponding generated popularity measure for the user account. In some implementations, the quality measure for the user account can be generated by providing an online account page for the user account (e.g., the home page for the user account on the corresponding online platform) for a plurality of discrete quality evaluations (e.g., by corresponding human reviewers utilizing respective client devices), receiving the discrete quality evaluations (e.g., respective ratings on a rating scale), and generating the quality measure as a function of the discrete quality evaluations. In some implementations, the popularity measure for the user account can be generated as a function of a quantity of end-user interactions with the account page for the user account, as determined based on historical records. For example, the popularity measure can be the greater of (a) one (or other fixed value) or (b) the logarithm of the quantity of interactions with the online account page by a population of users and over a time period (e.g., the last 3 months). For instance, the quantity of interactions can be a quantity of visits to the account page as determined from selections of search result(s) for the search page and/or web browser historical data.

Further, in implementations that are directed to training the model, the model is trained based on losses that are each generated as a function of both the popularity measure and the quality measure of a corresponding training instance. Put another way, the model is trained based on multiple objectives, where the multiple objectives include both quality (as reflected by the quality measure labeled outputs) and popularity (as reflected by the popularity measure labeled outputs). In these and other manners, the model can be trained to generate, based on values for a given user account, a single user account measure that reflects both quality and popularity of the given user account.

As described herein, such measures can be used to restrict provisioning of content items that are from user accounts having respective measures that fail to satisfy a threshold. This can prevent content items from low quality and/or low popularity accounts from being retrieved and/or can prevent such content items from being transmitted to and/or rendered at client devices, thereby conserving various associated computational and/or network resources. Further, this can additionally and/or alternatively promote retrieving, transmitting, and rendering of content items from high quality and/or high popularity accounts. This can increase the probability that users to whom the content items are rendered will engage with such content items and/or that such content items will satisfy the informational needs of the users, thereby mitigating the likelihood that such users will perform further computational activities (e.g., further searching, further browsing) to fulfill those informational needs. This can additionally and/or alternatively decrease the probability that such content items will include low-quality content that could be harmful to users (e.g., obscenities or other offensive content) and/or to corresponding client devices (e.g., nefarious links or other content).

In some of the implementations that are directed to training the model, the loss that is generated based on both a quality measure and a popularity measure of a labeled output of a training instance, can be a function of a first error (e.g., a mean squared error or other error) and a second error (e.g., a mean squared error or other error). The first error can be determined based on comparing a predicted measure (generated by processing input of the training instance using the current model) to the quality measure. The second error can be determined based on comparing the predicted measure to the popularity measure. In some of those implementations, the first and second errors can each be weighted with respective weightings. In some of those implementations, weights can be determined using black box optimization. Optionally, the first weighting for the first error can be the weight determined using Pareto optimization and the second weighting for the second error can be one minus the weight, or vice versa.

In some versions of those implementations, multiple models can be trained, each utilizing a unique combination of a first weighting for the first error and a second weighting for the second error. In the versions that train multiple models each utilizing a unique combination of the first weighting and the second weighting, a subset (e.g., one) of the models can then be selected for deployment/use based on evaluating the model(s). Evaluating each of the models can be in view of one or more metric(s) that seek to evaluate whether the model effectively generates predicted measures that discriminate between high quality and/or high popularity user accounts and low quality and/or low popularity user accounts. For example, a model can be evaluated based on a quality metric. For instance, the quality metric can be based on how many known low quality user accounts, when their corresponding values are processed using the model, result in predicted measures that fail to satisfy a threshold (with higher quantities indicating the model is effectively filtering out low quality user accounts). As another example, the model can additionally or alternatively be evaluated based on a popularity metric. For instance, the popularity metric can be based on how many known highly popular user accounts, when their corresponding values are processed using the model, result in predicted measures that satisfy the threshold (with higher quantities indicating the model is effectively including highly popular user accounts). In these and other manners, multiple models can be trained, but only model(s) that satisfy the further evaluation actually deployed. This can further ensure that content items from low quality and/or low popularity user accounts are restricted based on measures generated using the deployed model, while content items from high quality and/or high popularity user accounts are utilized—and resulting technical benefit(s) are achieved.

Which metric(s) (e.g. popularity metric, quality metric, and/or other metric(s)) are utilized in an evaluation, and/or how such metrics are utilized in the evaluation, can be based on one or more considerations. For example, the consideration(s) can include desired performance of product(s) in which a selected model will be deployed and/or other considerations. As one particular example of utilizing metrics, when multiple models are trained a given one of those models can be selected based on the given one of the models having a quality metric that satisfies a threshold and based on having a popularity metric that is highest amongst the popularity metric(s) of any other models that also have respective quality metrics that satisfy the threshold. As another particular example, assume that a model is already deployed. The deployed model can be one that is also trained based on losses generated based on both a quality measure and a popularity measure, or can be a model trained utilizing alternate techniques. In such an example, popularity and quality metrics can be generated for the deployed model, and popularity and quality metrics can also be generated for a given model trained based on losses generated based on both a quality measure and a popularity measure. If the quality metric for the given model is greater than or equal to the quality metric for the deployed model, and the popularity metric for the given model is greater than the popularity metric for the deployed model, the given model can be selected for replacing the deployed model. Otherwise, the given model will not be selected for replacing the deployed model.

Some implementations are additionally or alternatively directed to generating, using a trained model, corresponding user account measures for each of a plurality of user accounts, such as user accounts of an online platform. For example, for a given user account, values for defined features of the trained model can be identified, where the values are specific to the given user account. Those values can be processed using the trained model to generate a predicted user measure for the user account. The predicted user measure and its association to the user account can then be stored and utilized for one or more purposes.

For example, some implementations are additionally or alternatively directed to utilizing the generated predicted user measures, for the user accounts, in determining whether to render content items generated by (e.g., crafted by or shared by) the user accounts. In some of those implementations, a search of content items (e.g., posts or other content item(s) from an online platform) can be performed based on one or more queries to identify content items that are responsive to the one or more queries. A content item can be responsive to the one or more queries based on content including text, image(s), and/or other content that matches term(s) or other parameter(s) of the one or more queries. The predicted user measures can be used to restrict the search to only content items that are from those user account(s) whose predicted user measures satisfy a threshold. This can result in a more efficient (e.g., less computational time and/or faster) search by reducing the corpus of content items that are searched. Further, this can also prevent transmitting and/or rendering of any content items from user accounts whose predicted user measures fail to satisfy the threshold (as they are not searched). Additionally or alternatively, the predicted user measures can be used to filter out any responsive content items that are from the user account(s) whose predicted user measures fail to satisfy a threshold. This can prevent wasteful transmission of such content items to a client device and/or rendering of such content items at a client device, as they are filtered out based on the predicted user measures. This can additionally and/or alternatively decrease the probability that such content items will include low-quality content that could be harmful to users (e.g., obscenities or other offensive content) and/or to corresponding client devices (e.g., nefarious links or other content).

In some implementations that search content items (e.g., from an online platform) based on a query, the search is performed responsive to a submission of the query by a client device. In those implementations, the content items that are transmitted and caused to be rendered can be transmitted responsive to the submission of the query and presented as some of the search results that are responsive to the query. Optionally, other types of search results can also be identified, transmitted, and rendered responsive to the query. For example, if the content items searched are from an online platform are all posts, search results that are not posts (or links to posts) and that are not from the online platform can also be identified, transmitted, and rendered responsive to the query. For instance, search results can be provided for webpages and/or images that are not from the online platform.

In some implementations that search content items based on a query, the content items that are transmitted and caused to be rendered at a client device can be transmitted and caused to be rendered at the client device independent of submission of the query at the client device. For example, they can be transmitted as a push notification that is proactively rendered at the client device. For instance, the query can be identified as relevant to the client device based on a location of the client device and/or interests of a user of the client device, and the content items provided in a push notification based on the query being identified as relevant to the client device. In some versions of those implementations, the search based on the query is performed based on determining that the query, and/or related query/queries, are trending (e.g., experiencing an uptick in submission rate) in one or more geographic areas.

As described herein, some implementations that utilize generated predicted user measures, for user accounts, in determining whether to render content items published by the user accounts, compare the predicted user measures to a threshold. If the predicted user measures fail to satisfy the threshold, content items from the corresponding user accounts can be restricted. In some of those implementations, the threshold is fixed across multiple (or even all) types of queries. In other implementations, the threshold can be dynamically determined based on one or more properties of the query. For example, the threshold can be determined based on one or more classifications of the query, such as a primary (e.g., strongest) classification. For instance, where higher measures indicate higher popularity and/or higher quality user accounts, the threshold for "sports" queries can be lower than the threshold for "political" queries (i.e., the bar is higher for "political" queries than it is for "sports" queries). Also for instance, the threshold for "food" queries can be lower than the threshold for "news" queries. As another example, the threshold can be determined based on an extent of trending of the query, such as a geographical extent of trending of the query. For instance, where higher measures indicate higher popularity and/or higher quality user accounts, the threshold for a query that is trending only in a limited quantity (e.g., 10 or less) of cities can be lower than the threshold for a query that is trending nationally or even globally (i.e., the bar is higher for queries with a large geographic extent of trending). Also for instance, the threshold for a query that is trending to a first degree that is lesser than a second degree to which an additional query is trending, can be lower than the threshold for the additional query.

As described herein, in training and/or utilizing a model, values for features of user accounts are identified and processed using the model. Various features can be utilized. Some non-limiting examples of such features include: a Pagerank measure for an online account page for the user account; a quantity of user interactions with the online account page; a status of the user account as assigned by the online platform, a sentiment measure that is based on content items that are generated by the user account; a quantity of links, to the online account page, from domains that are in addition to online platform domains associated with the online platform for the user account; a link quality measure that is based on links included in content items that are generated by the user account; and/or a primary language for the user account. It is noted that, in some implementations, different models are utilized for different geographic regions and/or different languages. In some of those implementations, those different models can utilize different sets of features. For example, an English language based model may utilize a set of features, and a non-English language(s) based model may utilize only a subset of that set of features. As described herein, in some implementations training instances used in training the non-English language(s) based model can still be based on English language based training instances (e.g., by removing value(s) for those feature(s) not utilized in the non-English language(s) based model.

In various implementations, predicted user account measures are generated offline relative to their usage in determining whether to render content items from corresponding user accounts. Put another way, the predicted user account measures can be generated prior to being utilized and do not have to be generated online for each new utilization. Rather, new predicted user account measures can be generated at periodic (e.g., weekly) or non-periodic intervals. In some of those implementations, the predicted user account measures are pre-indexed with (or otherwise assigned to) their corresponding user accounts. This enables fast and efficient retrieval of the predicted user account measures, and fast and efficient utilization of the measures in determining whether to render content items from corresponding user accounts. This can reduce response time of, and/or computational burden on, computing device(s) in determining whether to render content items from corresponding user accounts.

The above description is provided as an overview of various implementations. The below description provides additional detail for those implementations, and for various additional implementations.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION OF THE DRAWINGS

Figure 1:
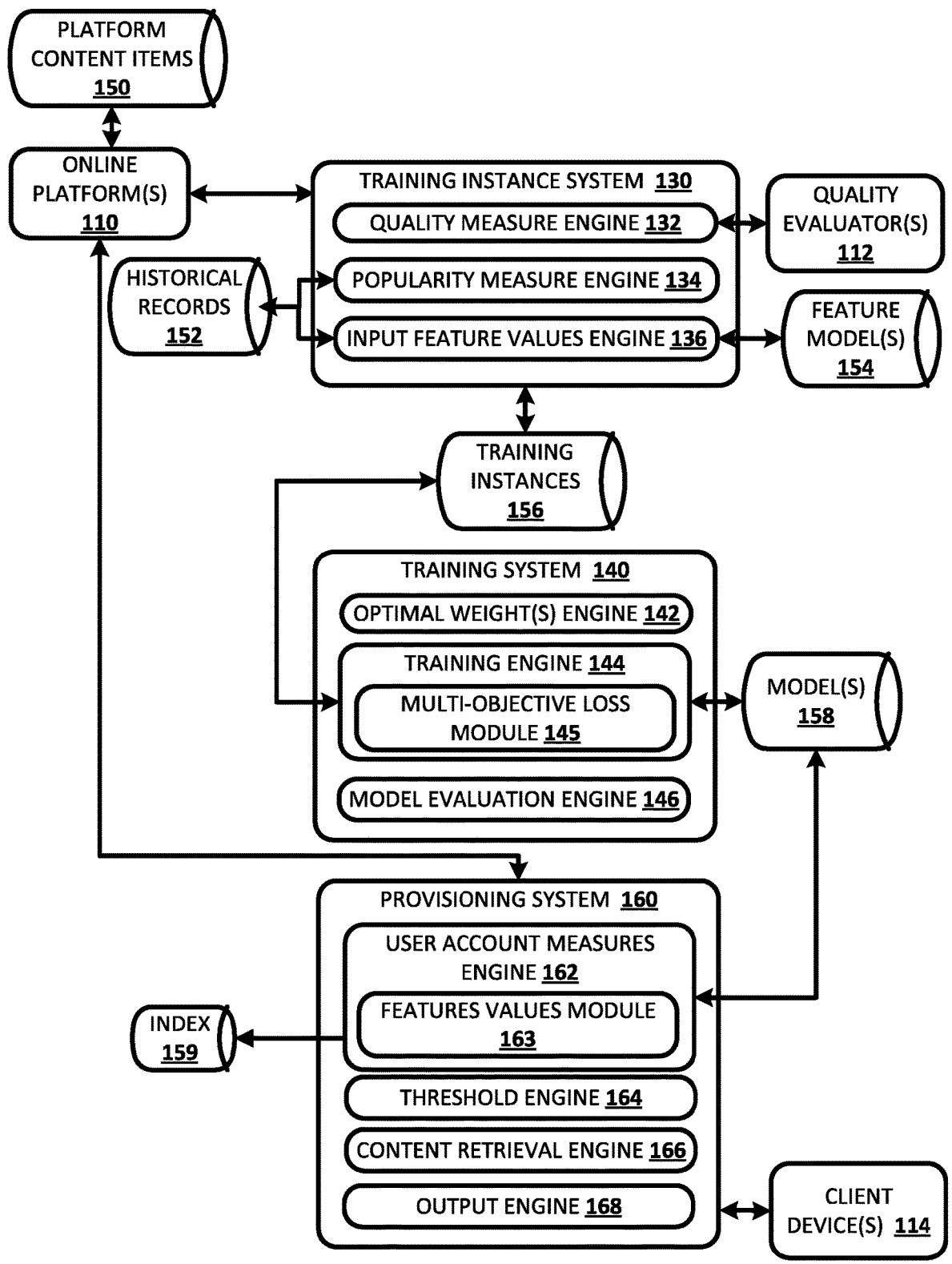
FIG. 1 is a block diagram of an example environment in which implementations described herein can be implemented.

FIG. 1 illustrates a block diagram of an example environment in which implementations described herein can be implemented. Although not illustrated in FIG. 1, the example environment can include one or more communication networks that facilitate communication between various components and/or subcomponents in the environment (e.g., via network interfaces of those components). Such communication network(s) may include a wide area network (WAN) such as the Internet, one or more intranets, and/or one or more bus subsystems—and may optionally utilize one or more standard communications technologies, protocols, and/or inter-process communication techniques.

FIG. 1 includes a training instance system 130 that can generate training instances that are each based on a user account, such as a user account of a given one of one or more online platforms 110, and stores training instances in training instances database 156. FIG. 1 also includes a training system 140 that utilizes the training instances, of training instances database 156, to train one or more models 158 to generate predicted user account measures by processing corresponding values for defined features. Further, FIG. 1 includes a provisioning system 160 that can utilize model(s) 158 to generate predicted user account measures, and use such measures in determining which content items are retrieved and/or transmitted to client device(s) 114. For example, provisioning system 160 can utilize such measures in determining to provide, to one of the client device(s) 114 proactively or in response to a request, only responsive content item(s) that are from user account(s) having associated measures that satisfy a threshold.

Training instance system 130 is illustrated with a quality measure engine 132, a popularity measure engine 134, and an input feature values engine 136. The training system 130 can select, from online platform(s) 110, a subset of user accounts for which to generate training instances for storing in training instances database 156. For example, stratified sampling, uniform random sampling, and/or other sampling techniques can be utilized to select a subset of user accounts. For example, a given one of online platform(s) 110 can be a microblogging and social network platform on which users post and interact with content items that are electronic messages or posts. Such an online platform can include millions of user accounts, and the training system 130 can select 1,000, 2,000, or other subset of those user accounts. For each of the selected user accounts, the quality measure engine 132 generates a quality measure for the user account, the popularity measure engine 134 generates a popularity measure for the user account, and the input feature values engine 136 identifies values for defined features, where the values are specific to the user account. The training instance system 130 generates a training instance based on each user account, where the training instance includes input that includes the values identified by input feature values engine 134 for that user account, and includes labeled outputs that include the quality measure and the popularity measure generated by engines 132 and 134 for that user account.

In generating a quality measure for a user account, the quality measure engine 132 can interface with one or more quality evaluators 112. The quality measure engine 132 can provide, to the one or more quality evaluators 112, information related to the user account. The quality evaluator(s) 112 can each respond with a corresponding discrete quality evaluation, such as a discrete quality evaluation that is a rating on a rating scale. For example, the rating scale can be a continuous scale with options from 0 to 1 for quality, with 1 being the highest quality and 0 being the lowest quality. The quality measure engine 132 can then generate the quality measure, for the user account, as a function of received discrete quality evaluations. For example, the quality measure can be based on the minimum of all received quality measures, as the next-to-minimum (i.e., the second lowest) of all received quality measures, or as an average of all received quality measures.

In some implementations, the information related to the user account, that is provided to the quality evaluators, includes an online account page (e.g., a link to the online account page) for the user account (e.g., the home page for the user account on the corresponding online platform). The information can be provided with instructions on evaluating the quality, with an explanation of the rating scale, and/or with interface elements that can be interacted with to select a discrete rating. In some implementations, the quality evaluators 112 are each a corresponding client device operated by a corresponding human, and the discrete quality evaluations are based on user interface input (e.g., directed to provided interface elements) provided by the corresponding human after reviewing the provided information.

In generating a quality measure for a user account, the popularity measure engine 134 can interface with historical records database 152, which can include historical records for the user account. In some implementations, the historical records database 152 includes data defining, for the user account, a quantity of user interactions for the user account, such as a quantity of interactions with the account page for the user account. In some of those implementations, the popularity measure engine 134 generates the popularity measure for the user account as a function of the quantity of user interactions. For example, the popularity measure engine 134 can generate a popularity measure that is the greater of one (or other fixed value) or the logarithm of the quantity of interactions with the account page. The quantity of interactions can be by a population of users and over a time period (e.g., the last month), and can be determined in various manners. For instance, the quantity of interactions can be a quantity of visits to the account page as determined from selections of search result(s) for the search page and/or web browser historical data.

In generating values, for defined features, for a user account, the input feature values engine 136 can determine those values utilizing historical records database 152, one or more feature models 154, and/or utilizing platform content items 150 for the user account. The input feature values engine 136 can determine values for various features, where the values are specific to the user account.

One example feature is a Pagerank measure for an online account page for the user account. The input feature values engine 136 can determine the value of the Pagerank measure, for the user account, based on utilization of the Pagerank algorithm for the online account page for the user account. Another example feature is a quantity of user interactions, over a time period, with the online account page, such as the logarithm of the quantity of user interactions. The input feature values engine 136 can determine the value for such a feature, for the user account, based on taking the logarithm of the quantity of user interactions. The quantity of user interactions can be identified from historical records database 152. Another example feature is based on a status of the user account, where the status is assigned by the online platform based on one or more criteria utilized by the online platform. For instance, the status of the user can be either "verified" or "not verified", and the input feature values engine 136 can assign a value of "1" for the feature if the user account is verified and a value of "0" otherwise. The input feature values engine 136 can determine whether the user account is verified based on analysis of the account page and/or through interaction with an API of the online platform.

Yet another example feature is a sentiment measure that is based on content items that are generated by the user account. The input feature values engine 136 can determine the value for such a feature, for the user account, based on processing one or more of the platform content items 150, for the user account, using sentiment model(s) of the feature model(s) 154. For example, text from such a content item can be processed using sentiment model(s) to determine direction(s) (e.g., positive or negative) and/or magnitude (e.g., how positive or how negative) of sentiment of the content item. The value for the user account can be based on an average, mean, or other function of determined directions and/or magnitudes of the sentiments for multiple content items for the user account. For example, ten or other quantities of content items for the user account can be sampled, sentiment direction(s) and/or magnitude(s) determined for each, and a value for the sentiment determined as a function of all ten direction(s) and/or magnitude(s).

Yet another example feature is a quantity of links to the online account page, from domains that are in addition to online platform domains associated with the online platform for the user account. The input feature values engine 136 can determine the value for such a feature, for the user account, based on link analysis from crawling the Internet. Yet another example feature is a link quality measure that is based on quality measures for the underlying content in links included in content items for the user account. The input feature values engine 136 can determine the value for such a feature, for the user account, based on identifying links in platform content items for the user account, using features model(s) to generate quality measures for the underlying content items in those links, and determining the value as a function of the generated quality measures. Yet another example feature is a primary language for the user account. The input feature values engine 136 can determine the value for such a feature (e.g., 1 for English 0 otherwise; or 1 for English, 2 for French, 3 for Spanish . . . etc.), for the user account, based on analysis of the account page and/or content items of the user account, and/or through interaction with an API of the online platform. Although various example features have been provided, additional and/or alternative features can be utilized in techniques described herein.

Turning now to the training system 140, it utilizes training instances, from training instances database 156, to train one or more model(s) 158. The training system 140 trains the model(s) 158 based on losses that are each generated as a function of both the popularity measure and the quality measure of a corresponding training instance. In some implementations, where multiple models 158 are trained, each model can be trained based on the same (or at least overlapping) training instances, but each can be trained using a different weighting for the errors that are based on the popularity measures, in generating the losses. By using different weightings, different losses are determined and, as a result, the parameters of the models 158, once trained, are different. In those implementations, the trained models 158 can be evaluated and a subset (e.g., one) selected for deployment based on the evaluation.

In some implementations, the model(s) 158 are each a corresponding regression model with the same architecture, but with different parameter(s) through training. For example, each of the model(s) 158 can be a regression model that includes a corresponding univariate function (e.g., piecewise linear curve) for each of the features, and that generates a predicted measure as a function (e.g., additive or multiplicative) of all of the univariate functions as applied to corresponding values. For example, a first univariate function can process a value for a Pagerank feature, a second univariate function can process a value for a sentiment feature, etc. In those implementations, the univariate functions each include corresponding parameter(s) (i.e., value(s) in the function) that are trained based on the determined multi-objective losses. Additional and/or alternative machine learning models can optionally be utilized. For example, a regression model that includes multivariate functions can be utilized. As another example, a feed forward neural network model with hidden layer(s) can be utilized.

In FIG. 1 the training system 140 is illustrated with an optimal weight(s) engine 142, a training engine 144 that includes a multi-objective loss module 145, and a model evaluation engine 146.

In various implementations, the multi-objective loss module 145 (described below), in generating a loss, generates the loss based on both a quality measure and a popularity measure of a labeled output of a training instance. The loss can be generated as a function of a first error (e.g., a mean squared error (MSE)) and a second error (e.g., an MSE). The first error can be determined by comparing a predicted measure (generated by processing input of the training instance using the current model) to the quality measure. The second error can be determined based on comparing the predicted measure to the popularity measure. In some of those implementations, the first and second errors can each be weighted differently during training of a given one of the models 158. As a particular example, the loss function can be represented as $\lambda$*MSE (quality measure of labeled output)+$(1-\lambda)$*MSE (popularity measure of labeled output), where $\lambda$ is a weight between 0 and 1. In the particular example, the weighting of the first error is $\lambda$, and the weighting of the second error is $(1-\lambda)$.

The optimal weight(s) engine 142 can be used to determine a plurality of optimal values for utilizing the weight in training the model(s) 158. For example, the optimal weight(s) engine 142 can determine optimal value(s) for the weight(s) using optimization (e.g., using a black-box optimizer). For instance, the optimal weight(s) engine 142 can determine an optimal value using multi-objective/Pareto optimization. The optimal value can be used as the weight, and one of the first weighting and the second weighting can be the weight, and the other of the first weighting and the second weighting can be one minus that weight. The first weighting and the second weighting can then be used in generating losses for training a corresponding one of the models 158 as described herein. The optimal weight(s) engine 142 can likewise be utilized to generate additional value(s), each of which can be used in determining weightings for use in training an additional of the models 158.

The training engine 144 utilizes the training instances 156 in training the model(s) 158. In training the models 158, the multi-objective loss module 145 of the training engine 144 generates losses based on comparing predicted measures generated from applying inputs of a training instance to the model, to both a quality measure and a popularity measure of a labeled output of the training instance. The training engine 144 updates parameters of the models 158 based on the losses. Further, in implementations where multiple model(s) 158 having the same architecture are trained, the multi-objective loss module 145 can, in training each model 158, use at least a different weight (as determined by the optimal weights engine 142) in training the model 158. For example, a first weight can be used in generating losses in training a first of the models 158, a second weight can be used in generating losses in training a second of the models 158, a third weight can be used in generating losses in training a third of the models 158, and so forth.

The model evaluation engine 146 can, when multiple models 158 are trained (e.g., each utilizing a unique weight in determining losses), evaluate each of the multiple models 158. Further, the model evaluation engine 146 can select a subset of the multiple models 158 for deployment/use by the provisioning system. The model evaluation engine 146 can evaluate each of the models in view of one or more metric(s) that seek to evaluate whether the model effectively generates predicted measures that discriminate between high quality and/or high popularity user accounts and low quality and/or low popularity user accounts. For example, the model evaluation engine 146 can evaluate a model based on how many known low quality user accounts, when their corresponding values are processed using the model, result in predicted measures that fail to satisfy a threshold. As another example, the model evaluation engine 146 can additionally or alternatively evaluate the model based on how many known highly popular user accounts, when their corresponding values are processed using the model, result in predicted measures that satisfy the threshold.

Turning now to the provisioning system 160, it is illustrated with a user accounts measures engine 162 that includes a features values module 163, a threshold engine 164, a content retrieval engine 166, and an output engine 168.

The user accounts measures engine 162 utilizes one of the trained model(s) 158 (e.g., one selected by the model evaluation engine 146) to generate, for each of a plurality of user accounts of an online platform, a corresponding predicted user account measure. The user accounts measures engine 162 can store associations of the user accounts to the corresponding generated measures in index 159 and/or other database(s). The user accounts, for which predicted user account measures are generated and associated, can include those used in generating training instances and/or additional user accounts (e.g., all user accounts of an online platform). In generating a predicted user account measure for a user account, the features values module 163 can identify the values, for those features, that are specific to the user account. Feature values module 163 can share one or more (e.g., all) aspects in common with input feature values engine 136 of training instance system 130 (and can even be the same module/engine). Accordingly, in identifying the values for features for a user account, feature values module 163 can likewise interface with the online platform 110, the historical records 152, and/or the feature model(s) 154.

The content retrieval engine 166 searches platform content items 150, based on one or more queries, to identify content items of online platform(s) 110 that are responsive to the one or more queries. The content retrieval engine 166 can search the platform content items 150 directly and/or utilizing an index of the content items, such as a separate index that is created based on crawling of platform content items 150.

In some implementations, the content retrieval engine 166 searches all content items 150 (directly or via an index). In other implementations, the content retrieval engine 166 searches only a subset of the content items 150. In some of those other implementations, the content items that are not searched by the content retrieval engine 166 can be not searched based on being from user accounts whose predicted measures (e.g., stored in index 159) fail to satisfy a threshold. In some versions of those implementations, the threshold is a fixed threshold. In some other version of those implementations, the threshold is a dynamic threshold. The threshold engine 164 can determine the value of the dynamic threshold based on one or more properties of the query/queries upon which the search is conducted. For example, the threshold can be based on classification(s) of the query/queries, based on whether the queries are considered local queries (e.g., include local point(s) of interest, are historically more frequent in a local area), and/or based on a geographic extent of current trending of the queries.

In some implementations, the output engine 168 determines which of the content item(s) retrieved by content retrieval engine 166 to transmit to one or more of the client device(s) for rendering. In some of those implementations, the content retrieval engine 166 prevents certain content item(s) from being transmitted based on those content item(s) being from user account(s) whose corresponding predicted measure fails to satisfy a threshold. For example, the content retrieval engine 166 can filter out certain content items that are from user account(s) whose corresponding predicted measure fails to satisfy a threshold. In some of those implementations, the threshold is a fixed threshold. In some other version of those implementations, the threshold is a dynamic threshold determined by threshold engine 164. In some additional and/or alternative implementations, only a given quantity of content items are transmitted for rendering at least initially. In some of those implementations, the output engine 168 selects the content items to include in that given quantity based at least in part on the predicted account measures for user accounts corresponding to the content items. For example, if only three content items are to be transmitted, the output engine 168 can select three content items based on them being from the three user accounts with the best predicted user account measures. Optionally, the output engine 168 can also consider query-dependent and/or content specific measure(s) in selecting the content items. For example, in determining whether to select a content item, the output engine 168 can consider the predicted account measure for the corresponding user account, as well as query-dependent measure(s) that reflect how closely the content item matches the corresponding query or queries and/or content specific measure(s). Content specific measure(s) are based on the content item itself (independent of the user account) and can include, for example, popularity of the content item, sentiment of the content item, age of the content item, and/or other feature(s) of the content item.

In some additional and/or alternative implementations, the output engine 168 utilizes the predicted measures in determining how transmitted content items should be rendered (e.g., positional order for rendering) by the client device(s). For example, content item(s) from user account(s) with the best predicted user account measure(s) can be caused to be presented positionally higher in a vertical listing, or positionally left in a horizontal listing, and/or initially in a scrollable carousel listing. Optionally, the output engine 168 can also consider query-dependent and/or content specific measure(s) in determining how transmitted content items should be rendered.

Figure 2:
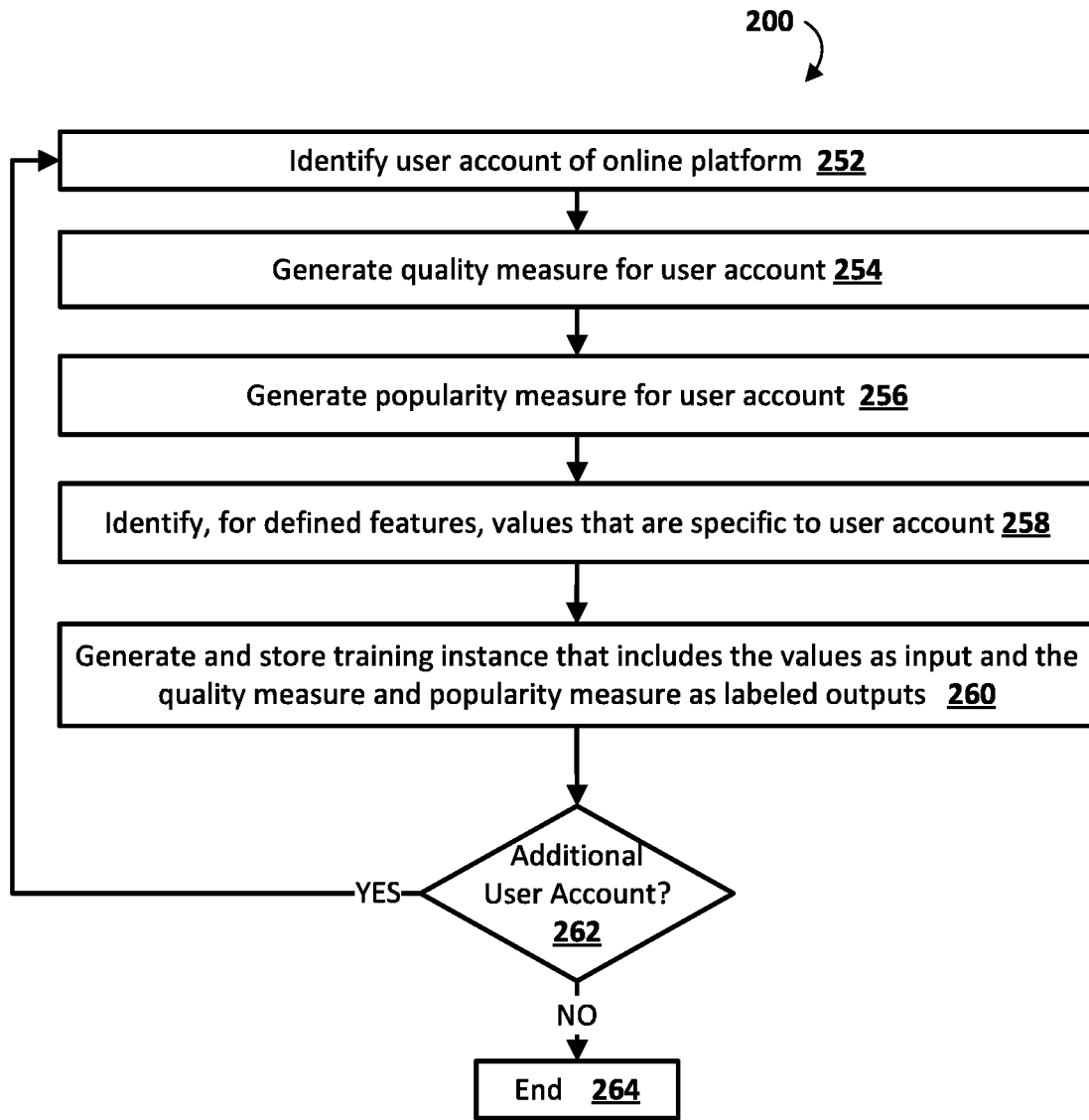
FIG. 2 is a flowchart illustrating an example method of generating training instances, for use in training a model for generating predicted user measures, according to various implementations disclosed herein.

Turning now to FIG. 2, a flowchart is provided that illustrates an example method 200 of generating training instances, for use in training a model for generating predicted user measures. For convenience, the operations of the flow chart are described with reference to a system that performs the operations. This system may include one or more components, such as one or more computing devices implementing training instance system 130 of FIG. 1. While operations of method 200 are shown in a particular order, this is not meant to be limiting. One or more operations may be reordered, omitted or added.

At block 252, the system identifies a user account of an online platform. For example, the system can identify the user account based on sampling of user accounts of the online platform.

At block 254, the system generates a quality measure for the user account. For example, the system can generate the quality measure as a function of multiple discrete quality evaluations. The multiple discrete quality evaluations can optionally each be received from a corresponding client device and be based on user interface input at the client device by a corresponding human evaluator. The multiple discrete quality evaluations can optionally be received in response to the system transmitting, to the client devices, information for the user account (e.g., the home page for the user account on the corresponding online platform), optionally along with evaluation instructions and/or user interface elements for providing the quality evaluations.

At block 256, the system generates a popularity measure for the user account. For example, the system can generate the popularity measure as a function of a quantity of user interactions with the account page for the user account, as determined based on historical records.

At block 258, the system identifies, for defined features, values that are specific to the user account. For example, the system can identify the features utilizing historical records, feature model(s), and/or through analysis of account page(s) of the user account and/or content item(s) of the user account.

At block 260, the system generates and stores a training instance that includes the values as input and the quality measure and popularity measure as labeled outputs.

At block 262, the system determines whether to identify and generate a training instance based on an additional user account. If so, the system proceeds back to block 252 and identifies an additional user account. If not, method 200 ends.

Figure 3:
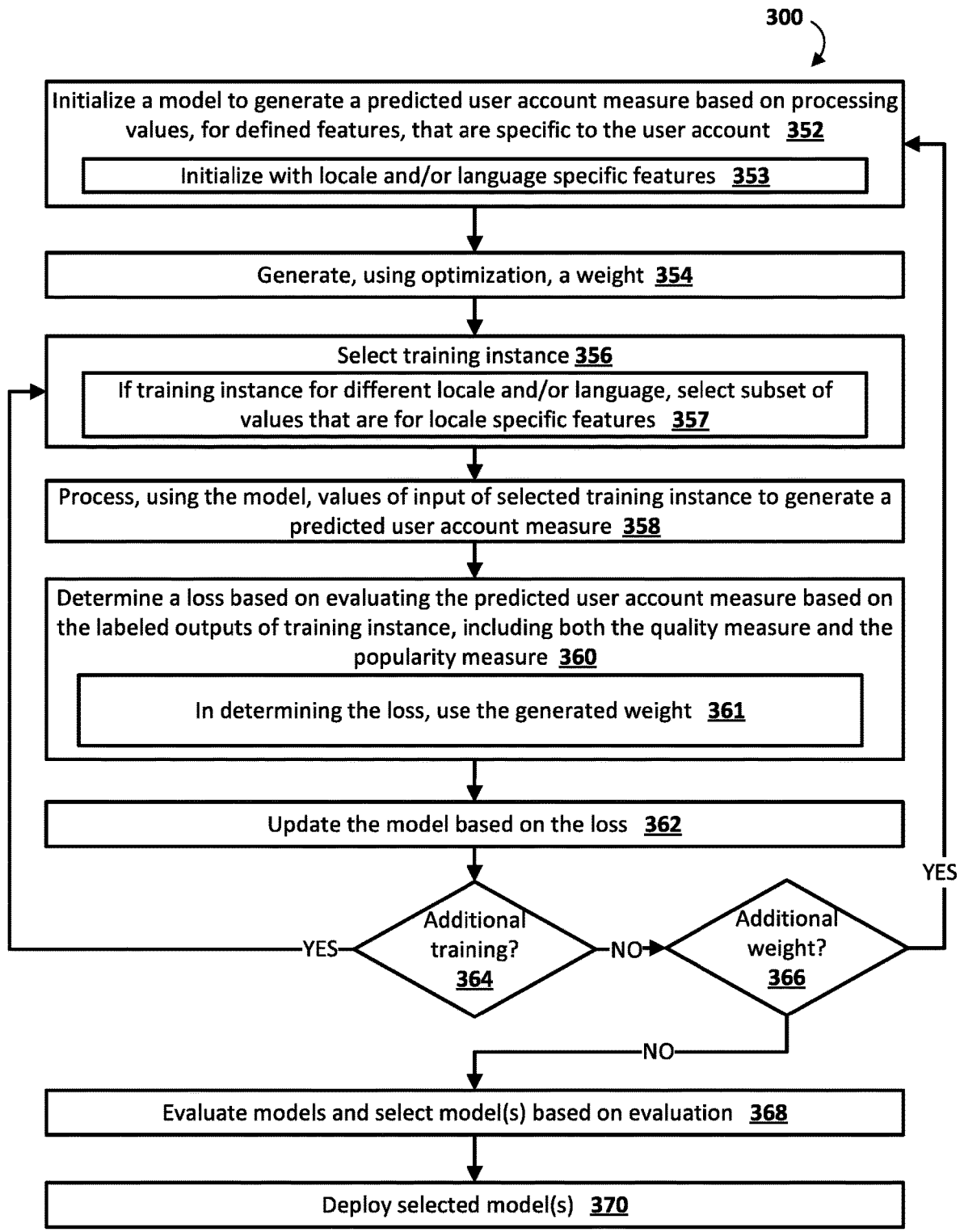
FIG. 3 is a flowchart illustrating an example method of training model(s) for generating predicted user measures, using both labeled quality measures and labeled popularity measures, according to various implementations disclosed herein.

FIG. 3 is a flowchart illustrating a method 300 of training model(s) for generating predicted user measures, using both labeled quality measures and labeled popularity measures. For convenience, the operations of the flow chart are described with reference to a system that performs the operations. This system may include one or more components, such as one or more computing devices implementing scoring training system 140 of FIG. 1. While operations of method 300 are shown in a particular order, this is not meant to be limiting. One or more operations may be reordered, omitted or added.

At block 352, the system initializes a model to generate a predicted user account measure based on processing values, for defined features, that are specific to the user account. For example, the system can initialize a regression model with input(s) for each of the defined features. For instance, each of the inputs can be to a corresponding univariate function for each of the defined features. Block 352 optionally includes sub-block 353, in which the model is initialized with features that are specific to a geographic locale and/or a language. For example, in iterations of method 300 that are for an English language model, the system can initialize the model with inputs for 10 defined features. On the other hand, for a non-English language model, the system can initialize the model with only 8 of those 10 defined features.

At block 354, the system generates, using optimization (e.g., using a black-box optimizer), a weight. For example, the system can generate the weight using multi-objective/Pareto optimization.

At block 356, the system selects a training instance, such as a training instance generated using method 200 of FIG. 2. Block 356 optionally includes sub-block 357. In sub-block 357, if the selected training instance is for a language and/or a geographic locale that differs from the locale and/or language for which the model was initialized in block 352, the system can select, for the training instance, a subset of the values of the input—where the selected subset are for those features that are specific to the locale and/or language for which the model was initialized. For example, if the initialized model is initialized with only 8 features, but the training instance includes those 8 and 3 more, the 3 extra can be effectively removed from the training instance.

At block 358, the system processes, using the model, the values of the input of the selected training instance to generate a predicted user account measure.

At block 360, the system determines a loss based on evaluating the predicted user account measure (generated at block 358) based on the labeled outputs of the training instance, including both the quality measure and the popularity measure of the labeled outputs. Block 360 optionally includes sub-block 361 where, in determining the loss, the system uses the weight generated at block 354. For example, the system can apply the weight as a weighting to a first error that is based on the quality measure, and can apply one minus the weight as a weighting to a second error that is based on the popularity measure.

At block 362, the system updates the model based on the loss. For example, the system can update parameter(s) of the function(s) for the input features, when the model is a regression model.

At block 364, the system determines whether to perform additional training of the current model. For example, the system can determine to perform more training based on whether unprocessed training instances remain, based on whether a threshold quantity of training epochs have been performed, based on whether a threshold duration of training has been performed, and/or based on other factor(s). When the decision at block 364 is yes, the system proceeds back to block 356 and selects another training instance.

When the decision at block 364 is no, the system proceeds to block 366 and determines whether to initialize and train an additional model utilizing an additional weight. For example, the system can determine to initialize and train an additional model when it is determined that a threshold quantity of models trained based on different weights have not yet been trained, when additional not yet utilized optimal weight(s) remain, and/or based on other factor(s).

When the decision at block 366 is yes, the system can proceed back to block 352, initialize a new model, generate an additional weight at block 354, and train the new model through multiple iterations of blocks 356, 358, 360, and 362 and using the additional weight. It is noted that, in various implementations, multiple models can be trained, each utilizing a different weight, in parallel with one another instead of serially as illustrated for ease in FIG. 3.

When the decision at block 366 is no, the system proceeds to block 368, where the system evaluates the trained models and selects a subset of the trained models based on the evaluation. The system can evaluate each of the models in view of metric(s) that seek to evaluate whether the model effectively generates predicted measures that discriminate between high quality and/or high popularity user accounts and low quality and/or low popularity user accounts. For example, the system can generate, for a trained model, both a quality metric and a popularity metric. For instance, the system can generate the quality metric based on how many known low quality user accounts, when their corresponding values are processed using the trained model, result in predicted measures that fail to satisfy a threshold (with higher quantities indicating the model is effectively filtering out low quality user accounts). Also, for instance, the system can generate the popularity metric based on how many known highly popular user accounts, when their corresponding values are processed using the trained model, result in predicted measures that satisfy the threshold (with higher quantities indicating the model is effectively including highly popular user accounts). The system can then determine whether to deploy the trained model based on the quality metric and the popularity metric. As one example, if the quality metric of the trained model is greater than or equal to the quality metric of an already deployed model, and the popularity metric of the trained model is greater than the popularity metric of the already deployed model, the trained model can replace the already deployed model. As another example, if the quality metric of the trained model satisfies a threshold, and the popularity metric of the trained model is greater than the popularity metric of any other trained model, then the trained model can be selected over the other trained model(s).

The system then proceeds to block 370 and deploys the model(s), selected at block 368, for use.

Figure 4:
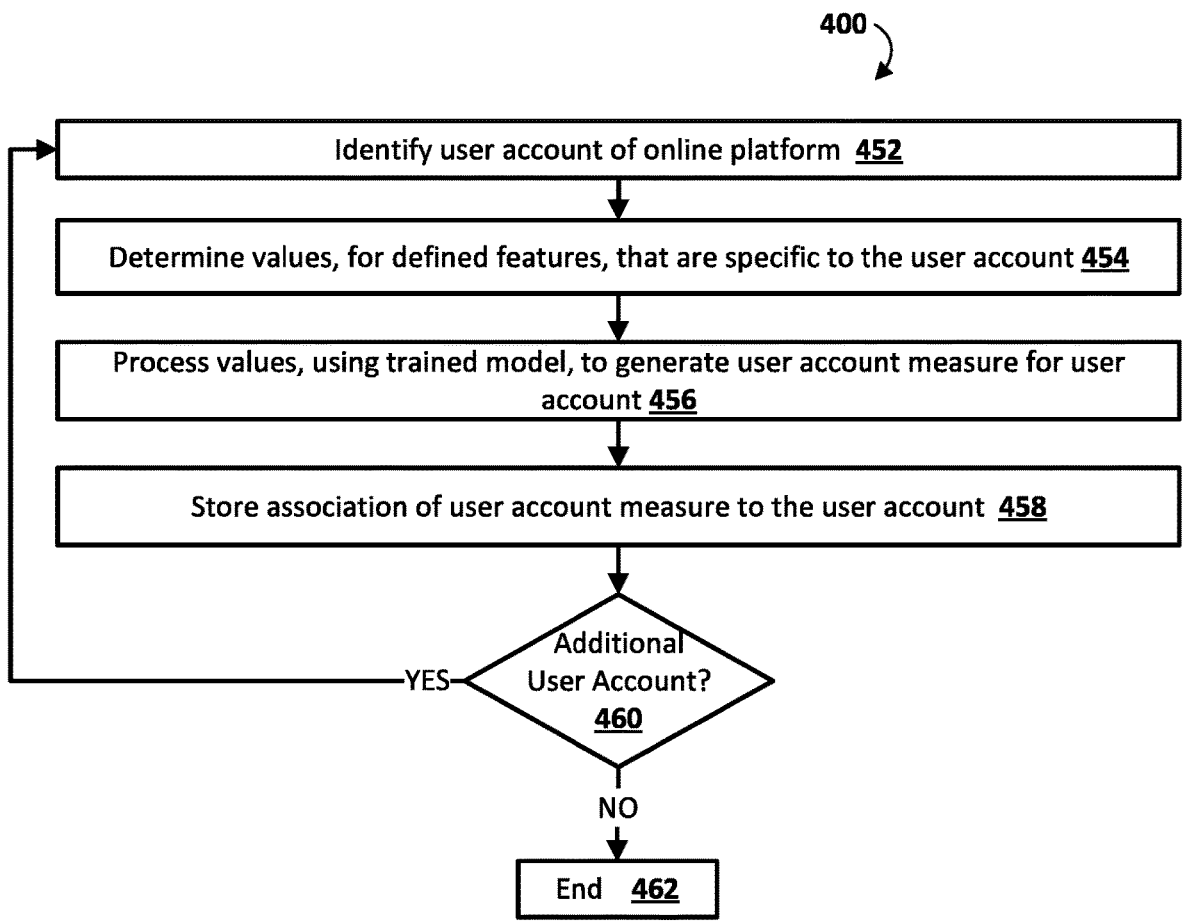
FIG. 4 is a flowchart illustrating an example method of using a trained model in generating user account measures for user accounts, according to various implementations disclosed herein.

FIG. 4 is a flowchart illustrating a method 400 of an example method of using a trained model in generating user account measures for user accounts. For convenience, the operations of the flow chart are described with reference to a system that performs the operations. This system may include one or more components, such as one or more computing systems that implement the user account measure engine 162 of FIG. 1. While operations of method 400 are shown in a particular order, this is not meant to be limiting. One or more operations may be reordered, omitted or added.

At block 452, the system identifies a user account of an online platform.

At block 454, the system determines values, for defined features, that are specific to the user account identified at block 452. The values for the defined features are identified based on the defined features being defined for the trained model to be utilized at block 456.

At block 456, the system processes the values determined at block 454, using a trained model (e.g., trained based on method 300 of FIG. 3), to generate a user account measure for the user account.

At block 458, the system stores an association of the user account measure to the user account. For example, the association can be a pointer or other data structure that associates the user account with the user account measure.

Figure 5:
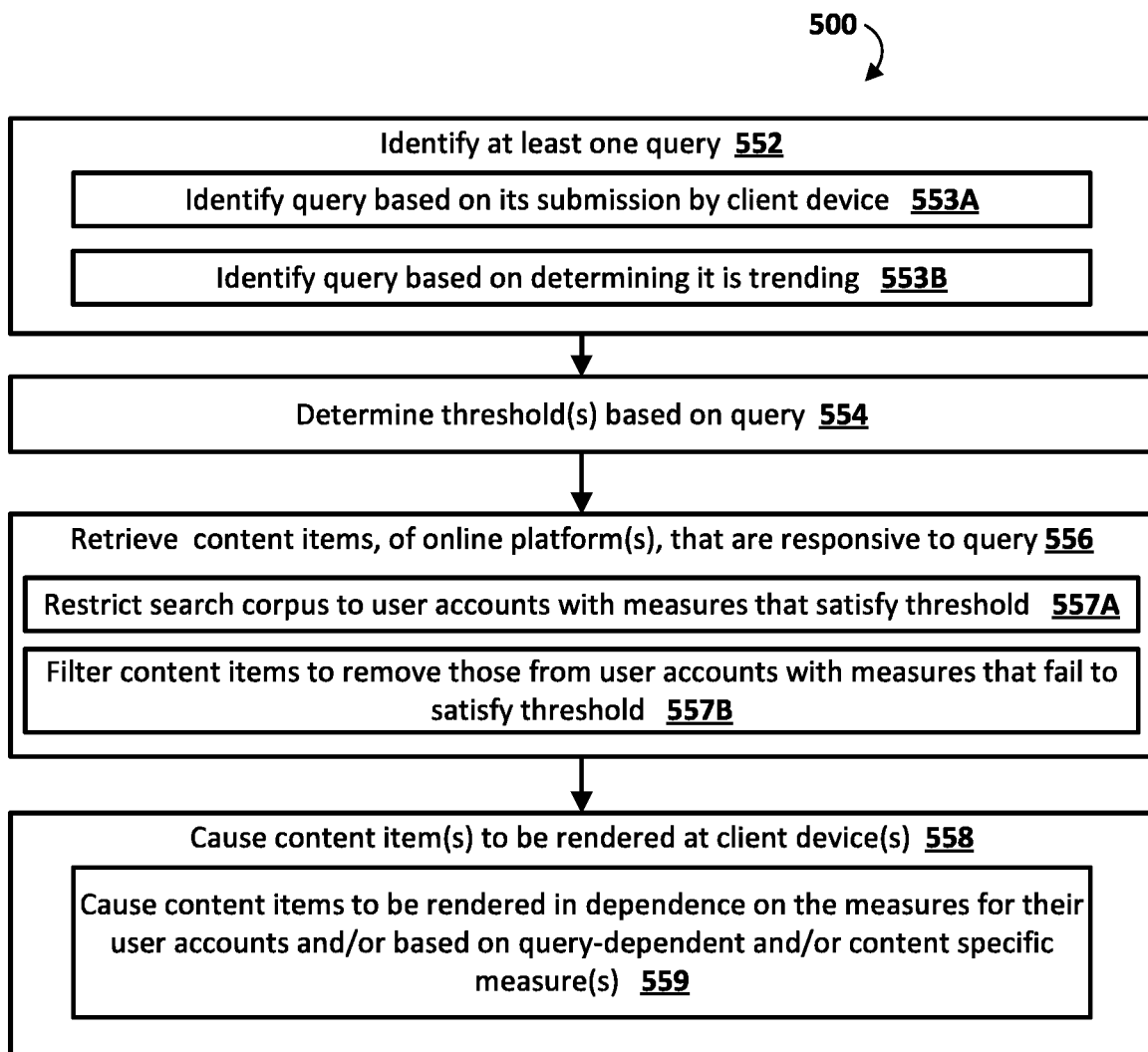
FIG. 5 is a flowchart illustrating an example method of using user account measures for user accounts, according to various implementations disclosed herein.

FIG. 5 is a flowchart illustrating a method 500 of using user account measures for user accounts. For convenience, the operations of the flow chart are described with reference to a system that performs the operations. This system may include one or more components, such as one or more computing devices implementing the threshold engine 164, the content retrieval engine 166, and/or the output engine 168 of FIG. 1. While operations of method 500 are shown in a particular order, this is not meant to be limiting. One or more operations may be reordered, omitted or added.

At block 552, the system identifies at least one query. Block 552 optionally includes sub-block 553A or sub-block 553B. At sub-block 553A, the system identifies a query based on its submission by client device (e.g., submission at a search interface responsive to user interface input). At sub-block 553B, the system identifies the query based on determining it is trending and/or is otherwise relevant to at least a plurality of users of client devices.

At block 554, the system determines threshold(s) based on one or more properties of the query identified at block 552. The threshold(s) can be used in sub-blocks 557A and/or 557B (described below). In other implementations, the system can instead use a default and/or static threshold(s).

At block 556, the system retrieves content items of online platform(s) based on the content items being responsive to the query. For example, the content items can be retrieved based on their underlying content matching one or more (e.g., all) terms of a text-based query. Block 556 optionally includes sub-block 557A and/or sub-block 557B.

At sub-block 557A, the system restricts the search corpus to user accounts with measures that satisfy the threshold of block 554. For example, the system can restrict the search to only content items from those user account(s) whose user account measures (e.g., as determined based on method 400 of FIG. 4) satisfy the threshold.

At sub-block 557B, the system filters content items to remove those from user accounts that fail to satisfy a threshold. When sub-block 557A and sub-block 557B are both performed, the threshold used in sub-block 557B can be the same as that used in sub-block 557A or, optionally, a more restrictive threshold than that utilized in sub-block 557A.

At block 558, the system causes one or more of the content items, retrieved and not filtered out, to be rendered at client device(s). For example, the system can transmit the content item(s) for rendering at the client device in a search result(s) page, a breaking news webpage, or a stand-alone push notification. Block 558 optionally includes sub-block 559, in which the system causes the content items to be rendered in dependence on the measure for their user accounts and/or based on query-dependent measure(s) and/or content specific measure(s). For example, the system can determine an order of presentation of the content items, or which content items are shown first (e.g., in a carousel), based at least in part (or solely) on the user account measures for the user accounts for the content items. The system can transmit the content items such that they are caused to be rendered at the client device in such manner(s). In some implementations, the system can additionally or alternatively determine the presentation order and/or which content items are rendered first based on query-dependent and/or content specific measures as described herein.

Figure 6A:
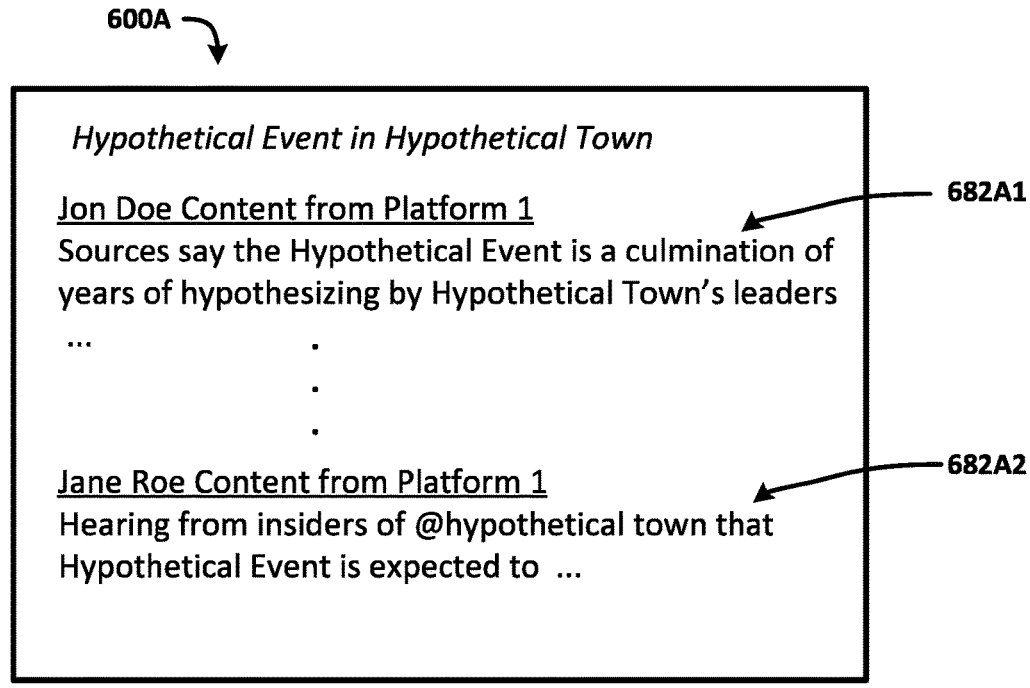
FIG. 6A and FIG. 6B each illustrates an example graphical user interface for presenting content items, selected based at least in part on user account measures, at a client device.
Figure 6B:
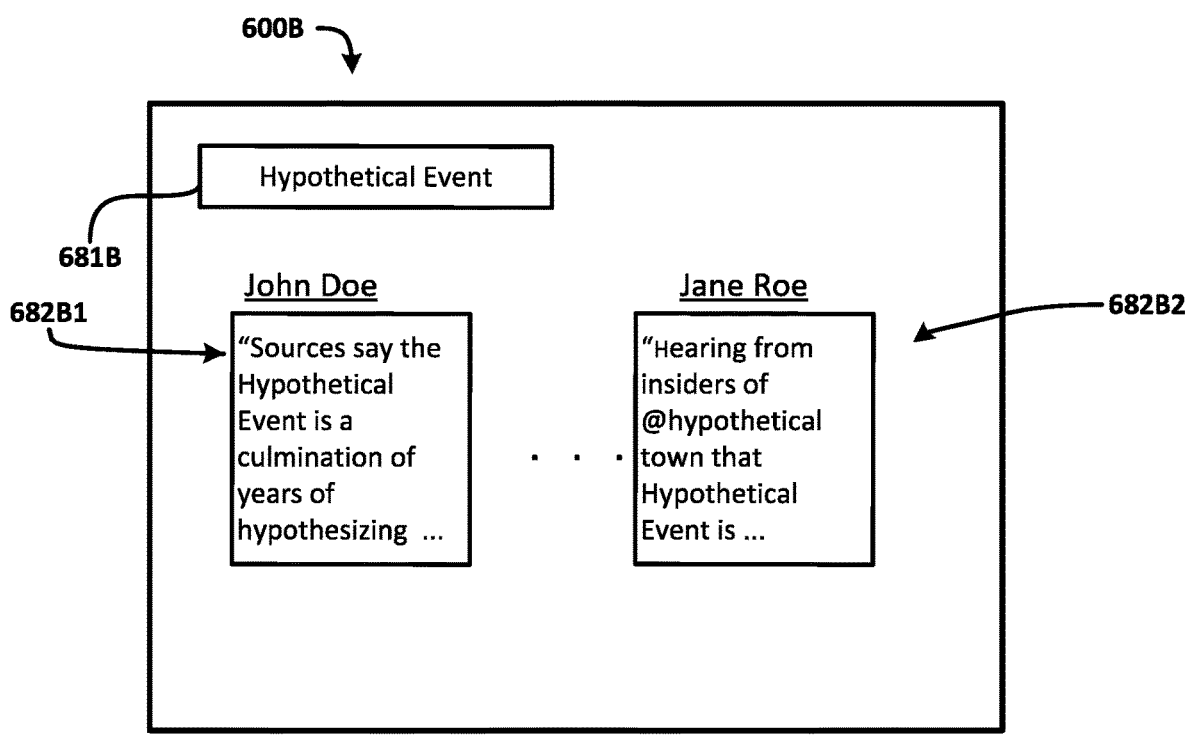

Turning now to FIG. 6A and FIG. 6B, example graphical user interfaces 600A and 600B for presenting, at a client device, content items that are selected based at least in part on user account measures. The graphical user interfaces 600A and 600B may be presented at one of the client devices 114 of FIG. 1 (e.g., in a browser executing at a client device and/or in another application executing at a client device) in response to a transmission to one of the client devices 106 by the provisioning system 160 of FIG. 1.

FIG. 6A illustrates an example of a content item 682A1 from a post and a content item 682A2 from another post, that each include a "snippet" of information from the corresponding post, and a link (e.g., the underlined text may be a hyperlink) to the entirety of the corresponding post. A user can select, via user interface input, a corresponding link to cause the client device to navigate to the corresponding post. The content item 682A1 and/or the content item 682A2 can be provided as a push notification (e.g., without requiring the user submit a query) to proactively notify the user of a hypothetical event in a hypothetical town. The content items 682A1 and 682A2 may have been identified based on the illustrated query of "Hypothetical Event in Hypothetical Town", which may be a trending query that is relevant to a user of the client device (e.g., relevance determined based on user preferences and/or a location of the client device). The content items 682A1 and 682A2 can be retrieved and/or caused to be rendered based at least in part on user account measures as described herein. For example, content item 682A1 can be one selected for providing based on a user account measure for "Jon Doe" and content item 682A2 can be one selected for providing based on a user account measure for "Jane Roe". Content from additional posts may also be provided, as indicated by the ellipsis in FIG. 6A.

FIG. 6B illustrates content items 682B1 and 682B2, from a post and content 682B2 from another post. In FIG. 6B, the content item 682B1 is the same as content item 682A1 of FIG. 6A and the content item 682B2 is the same as content item 682A2 of FIG. 6A. However, the content items 682B1 and 682B2 are displayed differently, and are presented as part of a carousel of content items. Further, in FIG. 6B the user has searched, in search bar 681B, for "hypothetical event", and the content items 682B1 and 682B2 are retrieved and/or provided responsive to that search (instead of proactively in FIG. 6A).

Although examples of graphical interfaces are presented in FIGS. 6A and 6B, it is understood that alternative forms of presenting (audibly and/or graphically) content items may additionally or alternatively be utilized.

Figure 7:
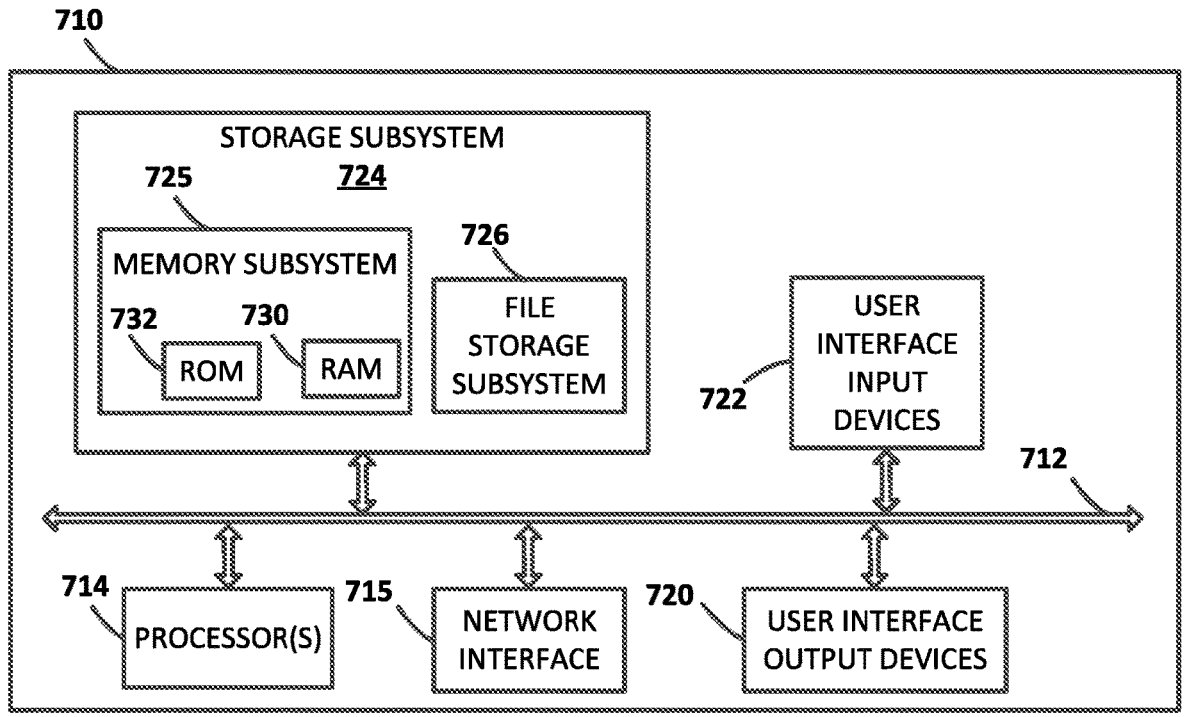
FIG. 7 illustrates an example architecture of a computing device.

FIG. 7 is a block diagram of an example computing device 710 that may optionally be utilized to perform one or more aspects of techniques described herein. Computing device 710 includes at least one processor 714 (e.g., a CPU, GPU, and/or TPU) which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 715. The input and output devices allow user interaction with computing device 710. Network interface subsystem 715 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a regular image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods described herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a solid state drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided that includes, for each of a plurality of identified user accounts: generating a corresponding quality measure; generating a corresponding popularity measure; and identifying a plurality of corresponding values for defined features, where the corresponding values are specific to the user account. The method further includes generating a plurality of training instances. The training instances each include: input that includes the corresponding values for a corresponding one of the user accounts, and labeled outputs of the corresponding quality measure and the corresponding popularity measure, for the corresponding one of the user accounts. The method further includes training a model using the training instances. The model can be used, once trained, to generate predicted measures, for user accounts, by processing the defined features. Training the model includes, for each of the training instances: processing, using the model, the input of the training instance to generate a corresponding predicted measure, and generating a corresponding loss based on evaluating the corresponding predicted measure based on the labeled outputs of the training instance, including both the corresponding quality measure and the corresponding popularity measure. The method further includes updating the model based on the corresponding losses.

These and other implementations may include one or more of the following features.

In some implementations, generating the corresponding loss includes: determining a first error based on comparing the corresponding predicted measure to the corresponding quality measure; determining a second error based on comparing the corresponding predicted measure to the corresponding popularity measure; and determining the loss as a function of the first error and the second error. In some of those implementations, determining the loss as the function of the first error and the second error includes applying a first weighting to the first error and a second weighting to the second error. For example, the first weighting can be a weight and the second error can be one minus the weight. In some versions of those implementations, the first error and the second error are both mean squared errors and/or the method further includes generating the weight using a black-box optimizer. In some additional and/or alternative versions of those implementations, the method further includes training, using the training instances, an additional model to generate predicted measures by processing the defined features. Training the additional model can include: using an alternate weight in lieu of the weight; evaluating the model subsequent to training the model; evaluating the additional model subsequent to training the additional model; and deploying, based on the evaluating, the better-performing of the model and the additional model.

In some implementations, generating the corresponding quality measure for each of the plurality of user accounts includes: identifying an online account page for the user account; providing the online account page for a plurality of discrete evaluations; receiving the plurality of discrete evaluations; and generating the corresponding quality measure as a function of the discrete evaluations. In some of those implementations, generating the corresponding quality measure as a function of the discrete evaluations includes selecting a minimum of the discrete evaluations, or a next-to-minimum of the discrete evaluations, as the corresponding quality measure.

In some implementations, generating the corresponding popularity measure for each of the plurality of user accounts includes: identifying an online account page for the user account; determining, from historical records, a quantity of user interactions with the online account page; and generating the corresponding popularity measure as a function of the quantity of user interactions.

In some of those implementations, generating the corresponding popularity measure as the function of the discrete evaluations includes generating the corresponding quality measure as the minimum of: (1) the logarithm of the quantity; and (2) one or other fixed value.

In some implementations, the defined features include one or more of: a Pagerank of an online account page for the user account; a status of the user account, that is assigned by an online platform for the user account; a quantity of user interactions with the online account page; a sentiment measure that is based on content items that are generated by the user account; a quantity of links, to the online account page, from domains that are in addition to online platform domains associated with the online platform for the user account; a link quality measure that is based on links included in content items that are generated by the user account; or a primary language for the user account.

In some implementations, the model is a regression model.

In some implementations, the method further includes, subsequent to training the model: identifying an additional user account of the at least one platform; determining, for the additional user account, a plurality of additional corresponding values for the defined features, where the additional corresponding values are specific to the additional user account; processing the plurality of additional values, using the model, to generate a predicted measure for the additional user account. Optionally, the predicted measure is output (e.g., transmitted) and/or the method further includes determining, based on the predicted measure, whether to render, responsive to a query, a content item that is responsive to the query and that is generated by the user account. In some versions of those implementations, the predicted measure is determined prior to submission of the query and determining, based on the predicted measure, whether to render, responsive to the query, a content item that is responsive to the query and that is generated by the user account, includes: determining, based on the predicted measure, to restrict the content item that is responsive to the query and that is generated by the user account; and in response to determining to restrict the content item, restricting the content item that is responsive to the query and that is generated by the user account. In some of those versions, restricting the content item that is responsive to the query and that is generated by the user account includes: preventing searching, for the query, of any content item generated by the user account; and/or filtering, from responsive content items from searching for the query, of any content items generated by the user account. In some additional or alternative versions of those implementations, determining, based on the predicted measure, whether to render, responsive to the query, the content item that is responsive to the query and that is generated by the user account, includes comparing the predicted measure to a threshold, and determining whether to render the content item based on whether the predicted measure satisfies the threshold. In some of those additional or alternative versions, the method further includes determining the threshold based on one or more properties of the query, such as a primary classification of the query and/or a geographical extent of trending of the query.

In some implementations, a method implemented by one or more processors is provided that includes, for each of a plurality of user accounts: identifying a plurality of corresponding values for defined features, where the corresponding values are specific to the user account; processing the corresponding values, using a trained model, to generate a corresponding predicted measure for the user account; and assigning, in one or more computer readable media, an association of the corresponding predicted measure to the user account. The method further includes, subsequent to assigning the associations of the corresponding predicted measures to the user accounts, determining, using the corresponding predicted measures, to, for at least a given query, restrict any content item, generated by a first subset of the user accounts, that is responsive to the one or more queries. Determining to restrict any content item generated by the first subset of the user accounts is based on the corresponding measures, for the first subset of the user accounts, failing to satisfy a threshold. The method further includes, in response to determining to restrict the content item, restricting rendering of any content item that is responsive to the given query.

These and other implementations may include one or more of the following features.

In some implementations, the method further includes determining, using the corresponding predicted measures, to, for the given query, render an additional content item, generated by a given user account that is not in the first subset, that is responsive to the given query. In those implementations, determining to render the additional content item is based on the corresponding measure, for the given user account, satisfying a threshold. In some versions of those implementations, the method further includes, in response to determining to render the additional content item, transmitting the additional content item to a client device to cause rendering of the additional content item. In some versions of those implementations, transmitting the additional content item to the client device is responsive to a submission, by the client device, of the given query. In some other versions of those implementations, transmitting the additional content item to the client device is independent of submission of any query, including the given query, by the client device.

In some implementations, restricting any content item that is responsive to the given query and that is generated by the first subset of the user accounts includes: preventing searching, for the given query, of any content items generated by the first subset of the user accounts; and/or filtering, from responsive content items from searching for the given query, of any content items generated by the first subset of the user accounts.

In some implementations, the method further includes determining the threshold based on one or more properties of the given query.

In some implementations, the trained model is trained based on losses that are each determined as a function of both a corresponding quality measure label and a corresponding popularity measure label.

Various implementations disclosed herein may include one or more non-transitory computer readable storage media storing instructions executable by a processor (e.g., a central processing unit (CPU), graphics processing unit (GPU), and/or Tensor Processing Unit (TPU)) to perform a method such as one or more of the methods described herein. Yet other various implementations may include a system of one or more computers that include one or more processors operable to execute stored instructions to perform a method such as one or more of the methods described herein.

What is claimed is:

1. A method implemented by one or more processors, the method comprising:
   subsequent to training a machine learning model based on losses that are each determined as a function of both a corresponding user account quality measure label and a corresponding user account popularity measure label:
   identifying a user account of a platform;
   determining, for the user account, a plurality of corresponding values for defined features, wherein the corresponding values are specific to the user account;
   processing the plurality of values, using the machine learning model, to generate a predicted measure, for the user account, that reflects both quality and popularity of the user account; and
   determining, based on the predicted measure for the user account:
   whether to render, responsive to a query, a content item that is responsive to the query and that is generated by the user account, and
   whether to render, responsive to an additional query, an additional content item that is responsive to the additional query and that is generated by the user account.

2. The method of claim 1, wherein the predicted measure is generated prior to submission of the query and wherein determining, based on the predicted measure, whether to render, responsive to the query, the content item that is responsive to the query and that is generated by the user account, comprises:
   determining, based on the predicted measure, to restrict the content item that is responsive to the query and that is generated by the user account; and
   in response to determining to restrict the content item, restricting the content item that is responsive to the query and that is generated by the user account.

3. The method of claim 2, wherein restricting the content item that is responsive to the query and that is generated by the user account comprises:
   preventing searching, for the query, of any content item generated by the user account.

4. The method of claim 2, wherein restricting the content item that is responsive to the query and that is generated by the user account comprises:
   filtering, from responsive content items from searching for the query, of any content items generated by the user account.

5. The method of claim 1, wherein determining, based on the predicted measure, whether to render, responsive to the query, the content item that is responsive to the query and that is generated by the user account, comprises:
   comparing the predicted measure to a threshold, and determining whether to render the content item based on whether the predicted measure satisfies the threshold.

6. The method of claim 5, further comprising:
   determining the threshold based on one or more properties of the query.

7. The method of claim 6, wherein the one or more properties of the query comprise:
   a primary classification of the query.

8. The method of claim 6, wherein the one or more properties of the query comprise:
   a geographical extent of trending of the query.

9. The method of claim 6, wherein the one or more properties of the query comprise:
   a primary classification of the query; and
   a geographical extent of trending of the query.

10. A method implemented by one or more processors, the method comprising:
    for each of a plurality of user accounts:
    identifying a plurality of corresponding values for defined features, wherein the corresponding values are specific to the user account;
    processing the corresponding values, using a trained model, to generate a corresponding predicted measure for the user account; and
    assigning, in one or more non-transitory computer readable media, an association of the corresponding predicted measure to the user account;
    subsequent to assigning the associations of the corresponding predicted measures to the user accounts:
    determining, using the corresponding predicted measures, to, for at least a given query, render a given content item, generated by a given user account, that is responsive to the one or more queries,
    wherein determining to render the given content item is based on the corresponding predicted measure, for the given user account, satisfying a threshold; and
    in response to determining to render the given content item:
    causing rendering of the given content item responsive to the given query;
    determining, using the corresponding predicted measures, to, for an additional given query, render an additional given content item, generated by the given user account, that is responsive to the additional given query,
    wherein determining to render the additional given content item is based on the corresponding predicted measure, for the given user account, satisfying a threshold; and in response to determining to render the additional given content item:
    causing rendering of the additional given content item responsive to the additional given query.

11. The method of claim 10, wherein causing rendering of the given content item responsive to the given query comprises:
    transmitting the given content item to a client device to cause rendering of the given content item.

12. The method of claim 11, wherein transmitting the given content item to the client device is responsive to a submission, by the client device, of the given query.

13. The method of claim 11, wherein transmitting the given content item to the client device is independent of submission of any query, including the given query, by the client device.

14. The method of claim 10, further comprising:
    determining the threshold based on one or more properties of the given query.

15. The method of claim 14, wherein the one or more properties of the given query comprise:
    a primary classification of the given query.

16. The method of claim 14, wherein the one or more properties of the given query comprise:
    a geographical extent of trending of the given query.

17. The method of claim 14, wherein the one or more properties of the given query comprise:
    a primary classification of the given query; and
    a geographical extent of trending of the given query.

18. The method of claim 10, wherein the trained model is trained based on losses that are each determined as a function of both a corresponding quality measure label and a corresponding popularity measure label.

19. A system comprising:
    a trained machine learning model trained based on losses that are each determined as a function of both a corresponding user account quality measure label and a corresponding user account popularity measure label;
    one or more processors executing stored instructions to:
        identify a user account of a platform;
        determine, for the user account, a plurality of corresponding values for defined features, wherein the corresponding values are specific to the user account;
        process the plurality of values, using the trained machine learning model, to generate a predicted measure, for the user account, that reflects both quality and popularity of the user account; and
        determine, based on the predicted measure for the user account:
            whether to render, responsive to a query, a content item that is responsive to the query and that is generated by the user account, and
            whether to render, responsive to an additional query, an additional content item that is responsive to the additional query and that is generated by the user account.

\* \* \* \* \*